US011719656B2

(12) United States Patent
Gallagher et al.

(10) Patent No.: US 11,719,656 B2
(45) Date of Patent: Aug. 8, 2023

(54) VARIABLE GAP THERMAL CONDUCTIVITY APPARATUS AND METHOD

(71) Applicant: UT-Battelle, LLC, Oak Ridge, TN (US)

(72) Inventors: Ryan C. Gallagher, Oak Ridge, TN (US); Nora D. Ezell, Oak Ridge, TN (US); Austin S. Chapel, Oak Ridge, TN (US); Nicholas G. Russell, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 89 days.

(21) Appl. No.: 17/484,566

(22) Filed: Sep. 24, 2021

(65) Prior Publication Data

US 2022/0107281 A1    Apr. 7, 2022

Related U.S. Application Data

(60) Provisional application No. 63/086,932, filed on Oct. 2, 2020.

(51) Int. Cl.
*G01N 25/18* (2006.01)
*G01K 17/08* (2006.01)
*G01N 25/20* (2006.01)

(52) U.S. Cl.
CPC ............ *G01N 25/18* (2013.01); *G01K 17/08* (2013.01); *G01N 25/20* (2013.01)

(58) Field of Classification Search
CPC ......... G01N 25/18; G01N 25/20; G01K 17/08
USPC ....................................................... 374/44
See application file for complete search history.

(56) References Cited

U.S. PATENT DOCUMENTS

| 4,928,254 | A  |         | 5/1990  | Knudsen et al. |
| 6,676,287 | B1 |         | 1/2004  | Mathis et al.  |
| 8,573,835 | B2 |         | 11/2013 | Miller et al.  |
| 10,578,569 | B2 |         | 3/2020  | Hurley et al.  |

FOREIGN PATENT DOCUMENTS

| CN | 1948957 A   | * | 4/2007 | ............. G01N 25/20 |
| CN | 110018193 A | * | 7/2019 | ............. G01N 25/18 |
| KR | 101767445 B1 |   | 8/2017 |                         |

OTHER PUBLICATIONS

Cooke et al., "Development of the Variable-Gap Technique for Measuring the Thermal Conductivity of Fluoride Salt Mixtures", Oak Ridge National Laboratory, Feb. 1973, pp. 1-117.

* cited by examiner

*Primary Examiner* — Mirellys Jagan
(74) *Attorney, Agent, or Firm* — Warner Norcross + Judd LLP

(57) ABSTRACT

An apparatus and a method for determining the thermal conductivity of a fluid specimen are provided. The apparatus and the method include determining thermal conductivity using a quasi-steady state variable gap axial flow technique. The fluid specimen is heated on one side by a heat source with a known power output and cooled on the other side. After reaching steady state, a resulting temperature drop through the fluid specimen exists. This temperature drop, the known fluid specimen thickness (or gap distance), and the known power output are used to calculate the thermal resistance of the fluid specimen. The thermal conductivity of the fluid specimen is then determined using a curve fit of thermal resistance with respect to gap distance.

12 Claims, 6 Drawing Sheets

VARIABLE GAP THERMAL CONDUCTIVITY APPARATUS AND METHOD

CROSS-REFERENCE TO RELATED APPLICATIONS

This application claims the benefit of U.S. Provisional Application 63/086,932, filed Oct. 2, 2020, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to a measurement of the thermal conductivity of fluids at high temperatures, for example molten salts, glass, metals, and ceramics.

BACKGROUND OF THE INVENTION

Thermal conductivity is an important material property when analyzing and designing thermal-fluid systems. Advanced energy applications such as concentrating solar plants, thermal energy storage plants, and next generation nuclear reactors have anticipated fluid operating temperatures well above 500° C. However, the existing knowledge of fluid thermal conductivity at elevated temperatures is limited, due to the difficulty of measurement. While many different techniques have been suggested, none have been demonstrated to measure the full range of potential heat transfer fluids, due to factors like high melting points, fluid volatility, and corrosion. The availability of a versatile, low-cost thermal conductivity system that operates from 200-1000° C. would allow designers and researchers to measure the conductivity of potential heat transfer fluids, providing more accurate data and ultimately better optimized systems.

SUMMARY OF THE INVENTION

An apparatus and a method for determining the thermal conductivity of a fluid specimen are provided. The apparatus and the method include determining thermal conductivity of the fluid specimen using a variable gap axial flow technique. The fluid specimen is heated on one side by a heat source with a known power output and cooled on the other side. After reaching steady state, a resulting temperature drop through the fluid specimen exists. This temperature drop, the known fluid specimen thickness, and the known power output are used to calculate the thermal resistance of the fluid specimen. The thermal conductivity of the fluid specimen is then determined using a curve fit of thermal resistance with respect to gap distance.

In one embodiment, the apparatus includes a heater cell within a test chamber. The heater cell includes a lower surface that is spaced apart from a flat base of the test chamber by a variable gap. The heater cell is disc-shaped and includes a first plurality of thermocouples and an internal heater module for providing a known power output. The heater cell includes one or more loops of sheathed resistance wire or one or more ceramic heaters. The test chamber includes multiple cooling channels and a second plurality of thermocouples. The second plurality of thermocouples are adjacent the flat base of the test chamber, and the cooling channels are disposed beneath the second plurality of thermocouples. The apparatus further includes an actuator module to cause the heater cell to move relative to the base in increments of as little as 5 µm to 10 µm, with a total gap range of between 0.01 mm to 25 mm.

The system further includes a controller module for determining the thermal conductivity of the fluid specimen. The controller module is communicatively coupled to the heater cell, the first and second plurality of thermocouples, and a distance sensor (e.g., a digital variance indicator) that is configured to measure the variable gap distance. The controller module is configured to: (a) measure a steady-state temperature difference between the first and second plurality of thermocouples for each gap distance; (b) determine the thermal resistance of the fluid specimen for each of the gap distances; and (c) determine the thermal conductivity of the fluid specimen based on the reciprocal of thermal resistance versus change in gap distance.

In these and other embodiments, the heater cell is modular, such that one heater cell for a particular fluid specimen can be readily replaced with another heater cell for a different fluid specimen. In addition, the test chamber can include a flange seal to separate an internal atmosphere from the ambient atmosphere. The internal atmosphere can include an inert gas, for example nitrogen or argon, to prevent oxidation of the interior of the test chamber at high temperatures. The test chamber is cylindrically shaped, being surrounded by a vertically-disposed clamshell furnace for heating the fluid specimen to a base temperature of 900° C., for example.

The system and method of the present invention offer the advantage of a fully sealed system and robust instrumentation, making it ideal for measuring volatile or hazardous molten salts. Other fluid specimens include molten glass, molten metals, molten ceramics, and high temperature gases. The apparatus and method allow for in-situ variation of a thin specimen gap (<0.3 mm) located in a fully sealed chamber within a furnace. As discussed herein, the variable gap method of the present invention uses one-dimensional approximations of Fourier's law by measuring the temperature difference across a variable, thin layer of the fluid specimen which is heated from the top with a resistive heater and which is cooled from the bottom with cooling channels. The heat flux through the fluid specimen is calculated using the power and area of the resistive heater. Thermal resistance between thermocouples above and below the fluid specimen is a function of the gap thickness, assuming the heat flux vectors are unidirectional. The thermal conductivity is then deduced by a curve fit to thermal resistance with respect to gap thickness.

These and other features of the invention will be more fully understood and appreciated by reference to the description of the embodiments and the drawings.

DETAILED DESCRIPTION OF THE CURRENT EMBODIMENTS

The current embodiments include an apparatus for determining the thermal conductivity of a fluid specimen using a variable gap axial flow technique. As discussed below, the fluid specimen is heated on one side by a heat source with a known power output and cooled on the opposite side. The power output, the temperature drop across the fluid specimen, and the fluid specimen thickness are used to calculate its thermal resistance. The thermal conductivity of the fluid specimen is then determined using a curve fit of thermal resistance with respect to gap distance. Though primarily described below in connection with molten salts, the apparatus is also well suited for measuring the thermal conductivity of other fluid specimens, including for example molten glass, molten metals, molten ceramics, a molten metal alloy, and high temperature gases.

Figure 1:
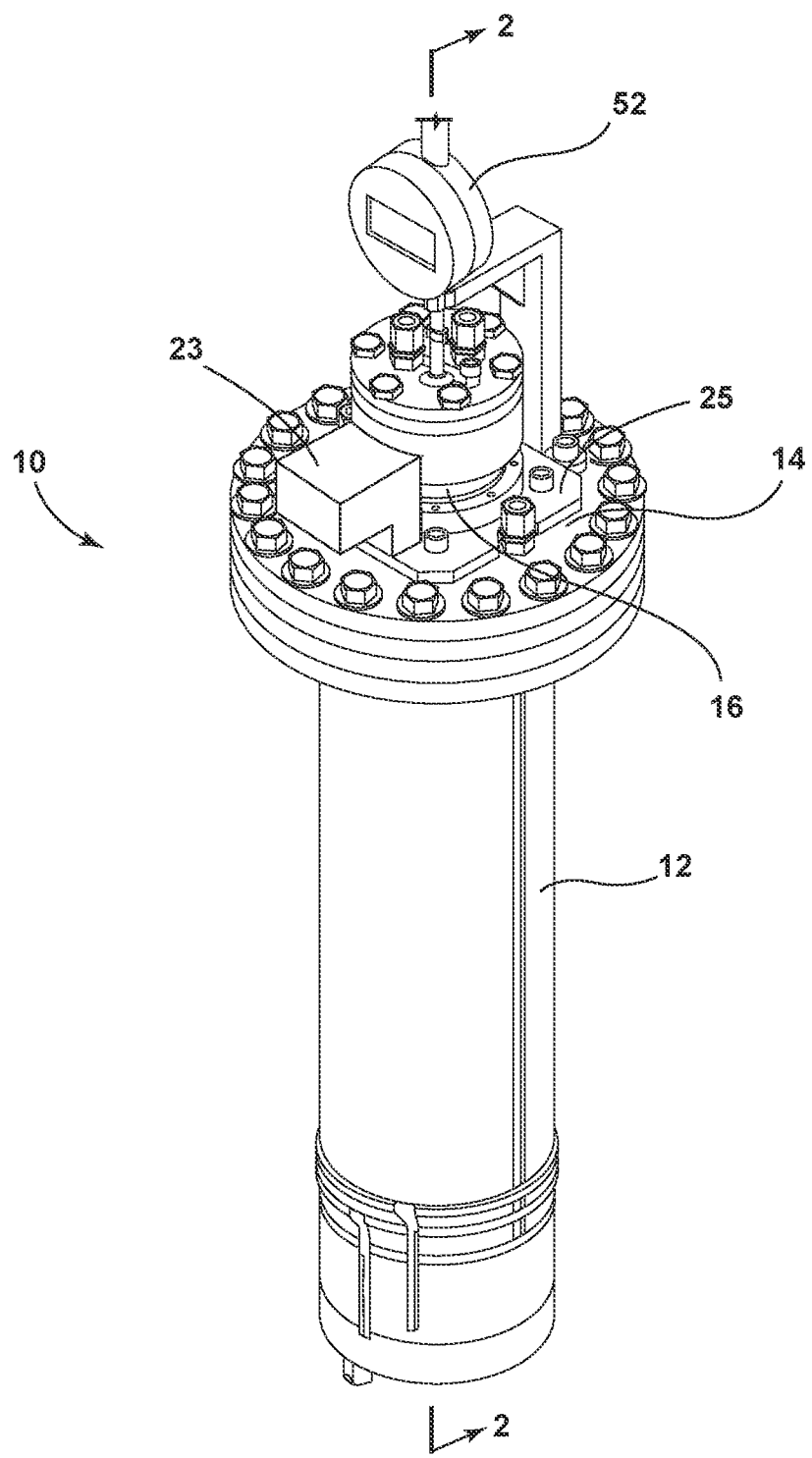
FIG. 1 is a perspective view of test apparatus for determining the thermal conductivity of a fluid specimen.
Figure 2:
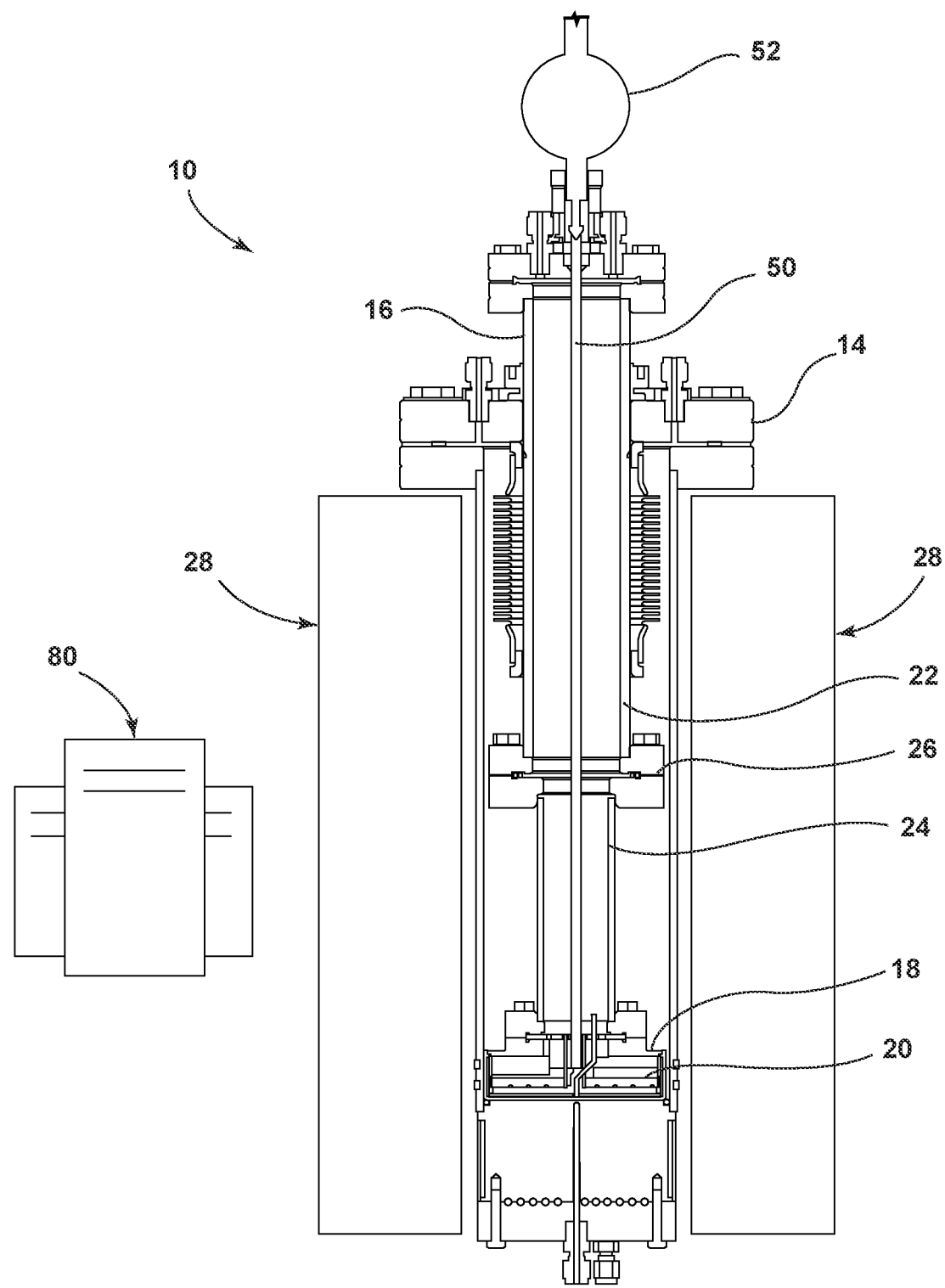
FIG. 2 is a cross-sectional view of test apparatus of FIG. 1 for determining the thermal conductivity of a fluid specimen.
Figure 3:
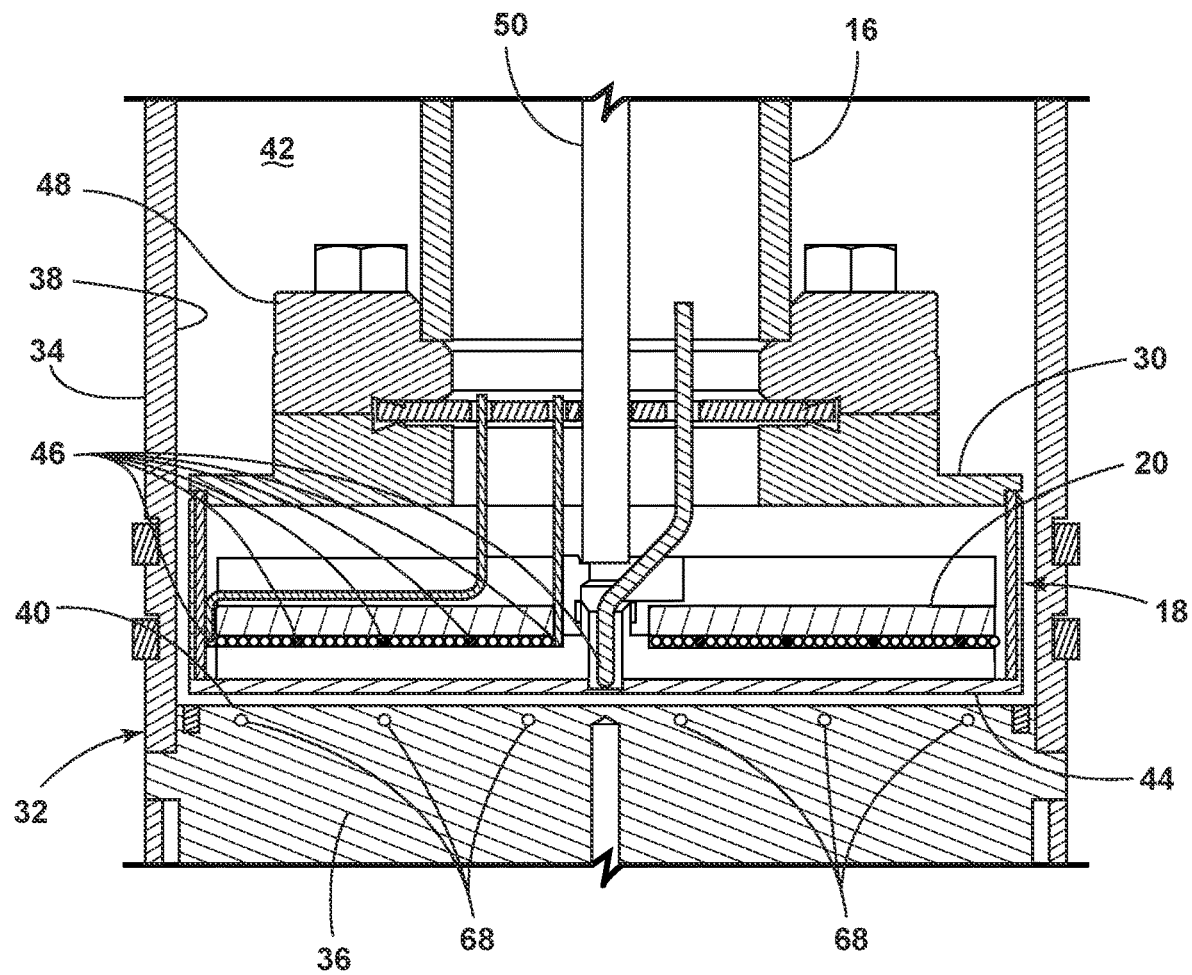
FIG. 3 is a close-up cross-sectional view of a moveable heater cell within the test apparatus illustrated in FIG. 2.

Referring first to FIGS. 1-3, an apparatus in accordance with one embodiment is illustrated and generally designated 10. The apparatus 10 includes a cylindrical outer housing 12 and an upper flange seal 14 that cooperate to define an enclosure for a movable stem 16. The moveable stem 16 includes, at its lowermost portion, a heater cell 18 comprising a disc-shaped head 30 with at least one internal heating element 20. The moveable stem 18 includes an upper portion 22 and a lower portion 24 that are coupled together at a flange joint 26, such that the lower portion 24 can be replaced without requiring replacement of the upper portion 22. The stem 18 is movable under control of an actuator module 23, for example a linear or rotary actuator. The actuator module 23 is secured to a retaining plate 25 that is bolted to the upper flange seal 14. The cylindrical housing 12 is surrounded by a furnace 28, for example a clamshell furnace, the furnace 28 elevating the temperature of the fluid specimen to greater than 500° C., for example at least 900° C.

As shown in FIG. 3, the heater cell 18 is contained within a test chamber 32. The test chamber 32 includes an annular sidewall 34 and a base 36. The inner-facing surface 38 of the sidewall 34 and the upward-facing surface 40 of the base 36 define an enclosure 42 for both the heater cell 18 and a fluid specimen. The inner diameter of the annular sidewall 34 is greater than the outer diameter of the heater cell 18, such that a clearance exists between the moveable head 30 and the annular sidewall 34. The downward-facing surface 44 of the heater cell 18 is spaced apart from the upward-facing surface 40 of the base 36 by a variable gap distance, also referred to herein as specimen thickness. The gap distance can be precisely controlled by raising and lowering the moveable stem 16 as set forth above, optionally in increments as little as 5 µm to 10 µm, allowing the gap distance of between 0.05 to 15 mm. The heater cell 18 further includes a first plurality of thermocouples 46 for measuring a steady-state temperature immediately above the fluid specimen. As further shown in FIG. 3, the heater cell 18 is removably joined to the stem 16 via a flange 48, such that the heater cell 18 can be detached between measurements. For example, measuring the thermal conductivity of a molten salt can require a different heater cell than for measuring the thermal conductivity of molten metal, e.g., a different heater arrangement and geometry. Though not required, a quartz rod 50 extends from the heater cell 18 to a digital variance indicator 52 for measuring the gap distance, however in other embodiments the gap distance can be measured from the vertical displacement of the exterior of the stem 16 without reliance on the quartz rod 50.

Figure 4:
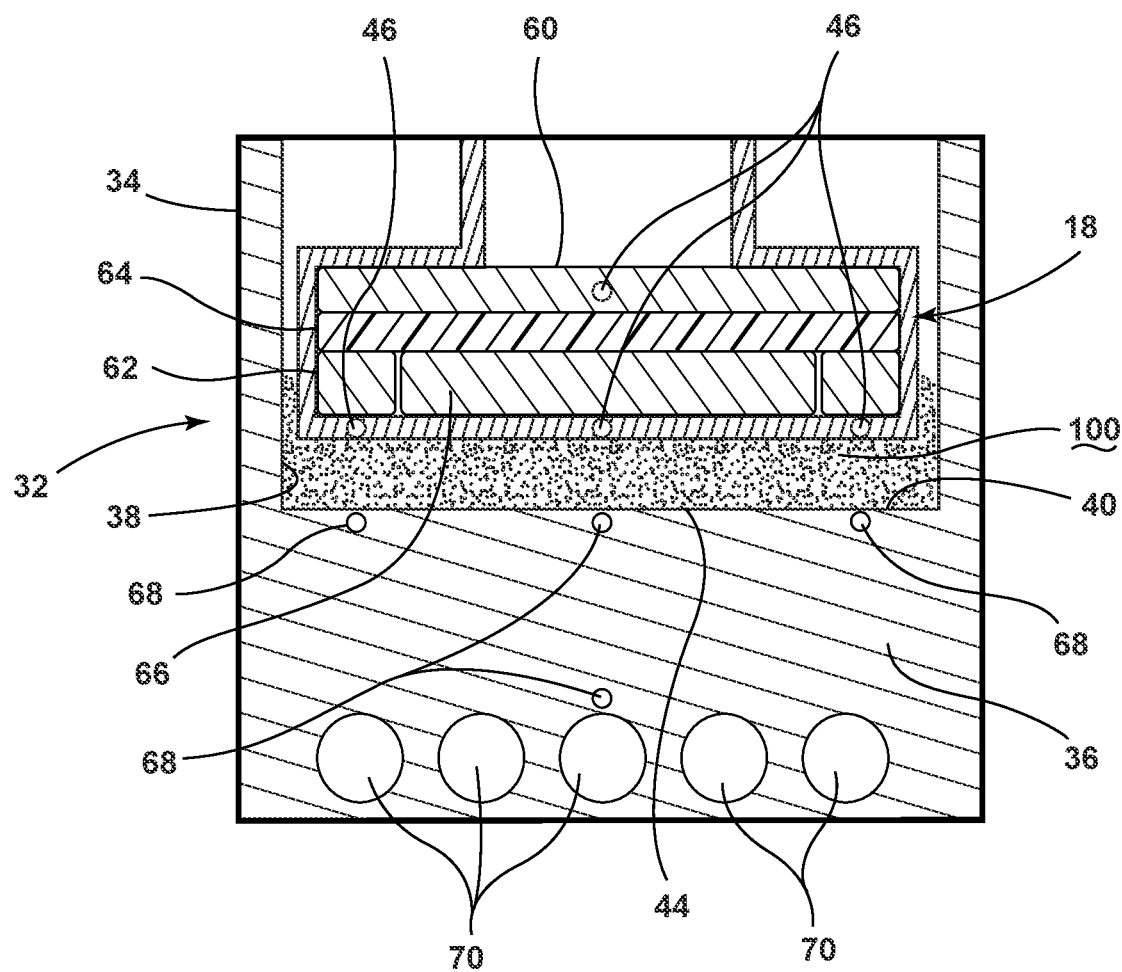
FIG. 4 is a close-up view of a variable gap between a movable head within a test chamber of the test apparatus of FIG. 1.

A further example of a heater cell 18 within a test chamber 32 is illustrated in FIG. 4. In this example, the heater cell 18 includes a disc-shaped head 30 having an axial guard heater 60, a radial guard heater 62, an insulator 64, and a primary heater 66. The radial guard heater 62 is self-contained within the heater cell 18, thereby reducing radial heat losses and ensuring an isothermal plate temperature of the fluid specimen 100. In other embodiments however the heater cell 18 includes fewer elements, dependent on the fluid specimen under evaluation. As also shown in FIG. 4, the heater cell 18 includes a first plurality of thermocouples 46. The thermocouples 46 are distributed along radial and axial directions within the heater cell 18 to determine heat loss corrections and to verify isothermal temperature at the bottom of the heater cell 18. Additional instrumentation such as fiber optics, pyrometers, or resistance temperature sensors (RTDs) can also be included in the heater cell 18. The test chamber 32 includes a second plurality of thermocouples 68 distributed along radial and axial directions within the base 36. At least two of the second plurality of thermocouples 68 are distributed radially, immediately below the upward-facing surface 40 of the base 36, and at least one of the second plurality of thermocouples 68 is distributed axially, being offset from the upward-facing surface 40 of the base 36 and nearer to a plurality of cooling channels 70. The cooling channels 70 are offset from the upward-facing surface 40 of the base 46. This offset allows for axial flow heat flux sensing by thermocouples, heat flux sensors, or fiber optics to measure the flux leaving the fluid specimen 100. The present invention also includes low-emissivity surfaces to ensure that the emissivity of material surrounding the fluid specimen 100 is minimized, which reduces radiative heat transfer uncertainties. For example, the upward-facing surface 40 of the base 36, the exterior of the heater cell 18, and the inner annular surface 38 of the sidewall 34 can comprise rhodium or platinum electroplating, electro-polishing, or conventional mechanical polishing.

Figure 5:
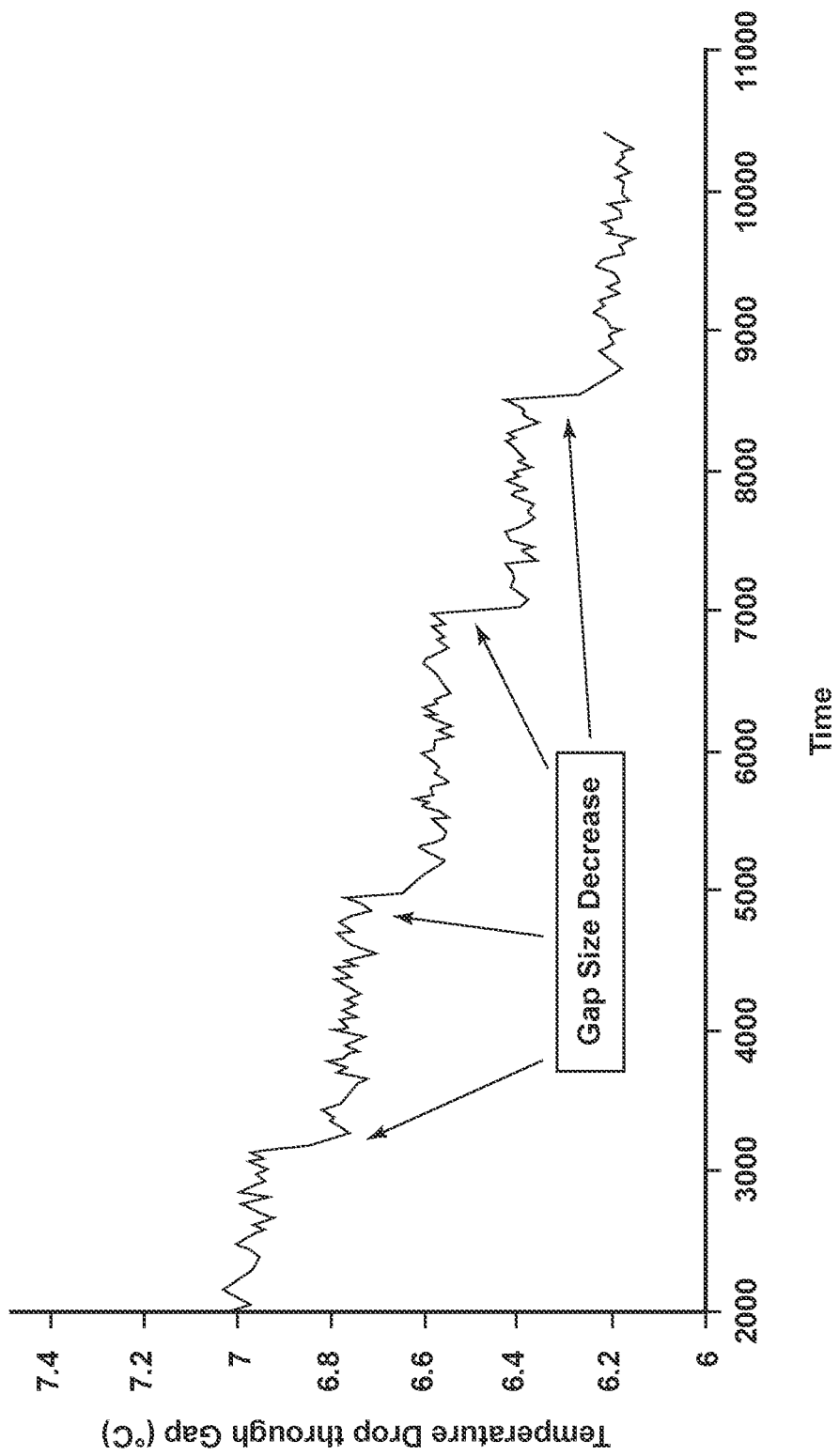
FIG. 5 is a graph of temperature drop versus time for five gap distances using the test apparatus of FIG. 1.

Operation of the apparatus 10 for measuring the thermal conductance of a fluid specimen will now be described. The fluid specimen 100 is added to the test chamber 32, which is then enclosed via the flange seal 14. An inert gas can displace ambient air from within the test chamber 32, thereby minimizing corrosion and increasing the service life of the apparatus 10. The furnace 28 is set to a desired temperature (e.g., 900° C.) and the system is allowed to reach thermal equilibrium (e.g., negligible temperature change over 0.5 to 1.0 hours). The heater elements 60, 62, 66 within the heater cell 18 then provide a known power output. If the hot side of the fluid specimen 100 exhibits a non-isothermal temperature, the power output can be lowered to reduce the temperature differences to less than 1° C. The gap distance is set then incremented or decremented by a fixed distance, for example 5 µm to 10 µm, or other interval dependent upon the fluid under evaluation. The fluid specimen 100 is heated from the top with the heater cell 18 and is cooled from the bottom with cooling channels 70. Once equilibrium is reached at each gap distance, the temperature difference across the fluid specimen 100 is recorded at a controller module 80. This is plotted in FIG. 5, which depicts the temperature drop at each gap size based on the output of the first plurality of thermocouples 46 and the second plurality of thermocouples 68. The temperature difference, the known fluid specimen thickness (or gap distance), and the known power output are used to calculate the thermal resistance of the fluid specimen 100. In particular, the thermal resistance R is calculated by the controller module 80 according to the following equation (1), in which dT represents the temperature drop across the fluid specimen, Q represents the heated power, and A represents the area of heating surface 44 of the heater cell 18:

$$R = \frac{dT \cdot A}{Q} \tag{1}$$

Figure 6:
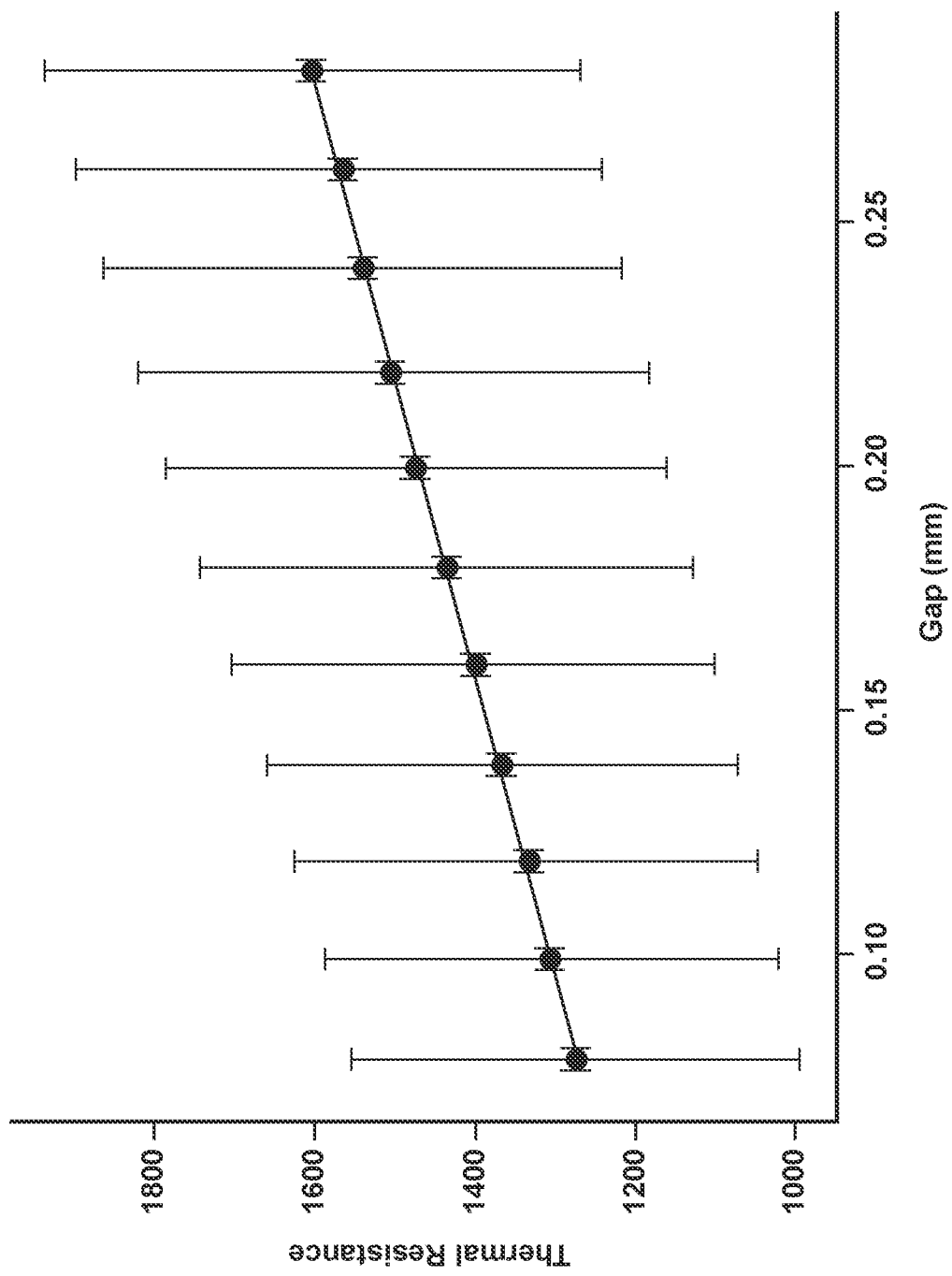
FIG. 6 is a graph of thermal resistance versus gap distance for eleven gap distances using the test apparatus of FIG. 1.

The thermal resistance R is plotted in FIG. 6 as a function of the gap distance. The heat flux can be corrected for heat losses using radial or axial thermocouples, or directly calculated using a heat flux sensor below the fluid specimen. The thermal conductivity of the fluid specimen is then determined using a curve fit of thermal resistance with respect to gap distance. In particular, the controller module 80 determines the thermal conductivity k by a least square fit of equations (2) or (3) on resistance versus gap size, where $k_r$ is the apparent radiative conductivity and dx represents the gap size (as recorded on the digital variance indicator 52):

$$R = k^{-1} \cdot dx + C \tag{2}$$

$$R = (k + k_r)^{-1} \cdot dx + C \tag{3}$$

Repeating the foregoing at different temperatures (e.g., by changing the temperature settings of the furnace) can also yield temperature dependent thermal conductivities. The foregoing method provides advantages over existing techniques, including laser flash thermal techniques. For example, volatile fluid specimens cannot be contained in existing laser flash crucibles, as salts tend to wet the walls, biasing results. Without a fully sealed crucible, laser flash thermal conductivity is not feasible for measuring volatile salts and would be extremely costly to install in radiation environments such as hot cells. In addition, laser flash techniques are an indirect measure of thermal conductivity, requiring density and specific heat capacity of the fluid specimen. By contrast, the above method is uniquely suited to determine the thermal conductivity of motel salts without knowledge of their density or specific heat capacity, optionally for the design and optimization of molten salt reactors. In particular, the thin fluid layer eliminates the potential for convection errors and allows for a direct measurement of thermal conductivity. The gap variation removes the need for multi-layer heat transfer corrections that are required with all other steady state techniques having fixed gaps. Further, the apparatus 10 includes a modular construction, which is ideal when components require replacement due to corrosion, and is fully sealed and can provide a fully inert cover gas when analyzing reactive fluids, for example when the fluid specimen is reactive with gas from the ambient environment.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. An apparatus for measuring thermal conductivity of a fluid specimen, the apparatus comprising:

a test chamber to be at least partially enclosed in a furnace that is maintained at a predetermined temperature, the test chamber having a solid base and a solid wall arranged to hold the fluid specimen on a flat surface of the base, wherein the base comprises:

cooling channels disposed inside the base at a predetermined distance from the flat surface of the base, the cooling channels configured to cool a first side of the fluid specimen adjacent to the flat surface of the base, and a first set of temperature sensors disposed inside the base and distributed between the flat surface of the base and the cooling channels, the first set of temperature sensors configured to sense a temperature of the cooled first side of the fluid specimen and configured to sense a temperature through the base;

a moveable head having a flat surface, the head disposed inside the test chamber such that the flat surface of the moveable head is parallel to and spaced apart by a controllable gap from the flat surface of the base such that the fluid specimen fills the gap, the head comprising:

a heater module disposed inside and adjacent to the flat surface of the head, the heater module configured to heat a second side of the fluid specimen, opposite of the first side of the fluid specimen, adjacent to the flat surface of the head, and a second set of temperature sensors disposed inside the head and distributed along the flat surface of the head, the second set of temperature sensors being configured to sense a temperature of the heated second side of the fluid specimen;

an actuator module mechanically coupled with the moveable head to cause, during operation of the apparatus, the head to move relative to the flat surface of the base to modify the gap between the flat surface of the head and the flat surface of the base;

a distance sensor configured to measure a size of the gap between the flat surface of the head and the flat surface of the base; and a controller module communicatively coupled with the actuator module, the distance sensor, the heater module, and the first and second set of temperature sensors, the controller module configured to:
a) determine a heater power (Q) based on a configuration of the heater module,
b) instruct the actuator module to translate the movable head to set the gap between the flat surface of the head and the flat surface of the base to a sequence of different gap sizes,
c) for each gap size from among the different gap sizes, obtain the gap size from the distance sensor and determine a temperature difference (dT) between the heated-side temperature obtained from the second set of temperature sensors, and the cooled-side temperature obtained from the first set of temperature sensors, and
d) determine the thermal conductivity of the fluid specimen based on the determined temperature differences for the corresponding gap sizes and based on the determined heater power.

2. The apparatus of claim 1, wherein the actuator module is configured to modify the size of the gap over a range of 0.01 mm-25 mm.

3. The apparatus of claim 1, wherein the actuator module is configured to modify the size of the gap in increments of 5 μm to 10 μm.

4. The apparatus of claim 1, wherein the temperature sensors comprise one or more of thermocouples, fiber optic-based temperature sensors, RTDs, or pyrometers.

5. The apparatus of claim 1, wherein the heater module comprises one or more of:
one or more loops of sheathed resistance wire; or
one or more ceramic heaters.

6. The apparatus of claim 1, wherein the moveable head includes a radial guard heater contained therein.

7. The apparatus of claim 1, wherein the fluid specimen comprises molten salt, molten glass, molten ceramic, molten metal, or a molten metal alloy.

8. The apparatus of claim 1, wherein the test chamber is sealed from an ambient environment, wherein the fluid specimen is reactive with gas from the ambient environment.

9. The apparatus of claim 1, wherein, to determine the thermal conductivity of the fluid specimen, the controller module is configured to:
determine thermal resistances (R) as the respective temperature differences multiplied by an area of the heater module (A) and divided by the heater power (R=(dT·A)/Q),
fit the determined thermal resistances for the corresponding gap sizes using a least square fit, and
determine the thermal conductivity of the fluid specimen from the fit.

10. A system comprising:
an apparatus for measuring thermal conductivity of a fluid specimen, the apparatus comprising:
a test chamber to be at least partially enclosed in a furnace that is maintained at a predetermined temperature, the test chamber having a solid base and a solid wall arranged to hold the fluid specimen on a flat surface of the base, wherein the base comprises:
cooling channels disposed inside the base at a predetermined distance from the flat surface of the base, the cooling channels configured to cool a first side of the fluid specimen adjacent to the flat surface of the base, and
a first set of temperature sensors disposed inside the base and distributed between the flat surface of the base and the cooling channels, the first set of temperature sensors configured to sense a temperature of the cooled first side of the fluid specimen and configured to sense a temperature through the base;
a moveable head having a flat surface, the head disposed inside the test chamber such that the flat surface of the moveable head is parallel to and spaced apart by a controllable gap from the flat surface of the base, such that the fluid specimen fills the gap, the head comprising:
a heater module disposed inside and adjacent to the flat surface of the head, the heater module configured to heat a second side of the fluid specimen, opposite of the first side of the fluid specimen, adjacent to the flat surface of the head, and
a second set of temperature sensors disposed inside the head and distributed along the flat surface of the head, the second set of temperature sensors being configured to sense a temperature of the heated second side of the fluid specimen;
an actuator module mechanically coupled with the movable head to cause, during operation of the apparatus, the head to move relative to the flat surface of the base to modify the gap between the flat surface of the head and the flat surface of the base;
a distance sensor configured to measure a size of the gap between the flat surface of the head and the flat surface of the base; and
a controller module communicatively coupled with the actuator module, the distance sensor, the heater module, and the first and second set of temperature sensors, the controller module configured to:
a) determine a heater power (Q) based on a configuration of the heater module,
b) instruct the actuator module to translate the movable head to set the gap between the flat surface of the head and the flat surface of the base to a sequence of different gap sizes,
c) for each gap size from among the different gap sizes, obtain the gap size from the distance sensor and determine a temperature difference (dT) between the heated-side temperature obtained from the second set of temperature sensors, and the cooled-side temperature obtained from the first set of temperature sensors, and
d) determine the thermal conductivity of the fluid specimen based on the determined temperature differences for the corresponding gap sizes and based on the determined heater power; and
a furnace at least partially enclosing the apparatus, the furnace being maintained at the predetermined temperature.

11. The system of claim 10, wherein the controller module is configured to:
set the predetermined temperature of the furnace to a sequence of different furnace temperatures; and
determine a steady-state thermal conductivity of the fluid specimen as a function of the furnace temperature by iterating operations a) through d) for each furnace temperature from among the different furnace temperatures.

12. The system of claim 10, wherein the controller module is configured to:
cause a temperature transient to the furnace, and determine a transient-mode thermal conductivity of the fluid specimen by iterating operations a) through d) during the furnace temperature transient.

\* \* \* \* \*